(No Model.) 2 Sheets—Sheet 1.

H. W. HALES.
CAMERA.

No. 423,682. Patented Mar. 18, 1890.

WITNESSES:

INVENTOR
H. W. Hales
BY Munn & Co.
ATTORNEY (No Model.) 2 Sheets—Sheet 2.

H. W. HALES.
CAMERA.

No. 423,682. Patented Mar. 18, 1890.

WITNESSES:

INVENTOR
H. W. Hales
BY Munn & Co.
ATTORNEY

UNITED STATES PATENT OFFICE.

HENRY W. HALES, OF RIDGEWOOD, NEW JERSEY, ASSIGNOR TO EDWARD I. HORSMAN, OF NEW YORK, N. Y.

CAMERA.

SPECIFICATION forming part of Letters Patent No. 423,682, dated March 18, 1890.

Application filed April 10, 1889. Serial No. 306,702. (No model.)

*To all whom it may concern:*

Be it known that I, HENRY W. HALES, of Ridgewood, in the county of Bergen and State of New Jersey, have invented a new and useful Improvement in Cameras, of which the following is a full, clear, and exact description.

The principle of my invention lies in supplying cameras with what I term a "universal front," whereby the lens may be readily adjusted in any direction—horizontally, vertically, or at any angle—to bring the image properly upon the plate. By my construction the lens is not only rendered movable in every conceivable direction, but all danger of sticking in damp weather is obviated, and the construction is cheap and durable.

Reference is to be had to the accompanying drawings, forming a part of this specification, in which similar letters of reference indicate corresponding parts in all the figures.

Figure 1:
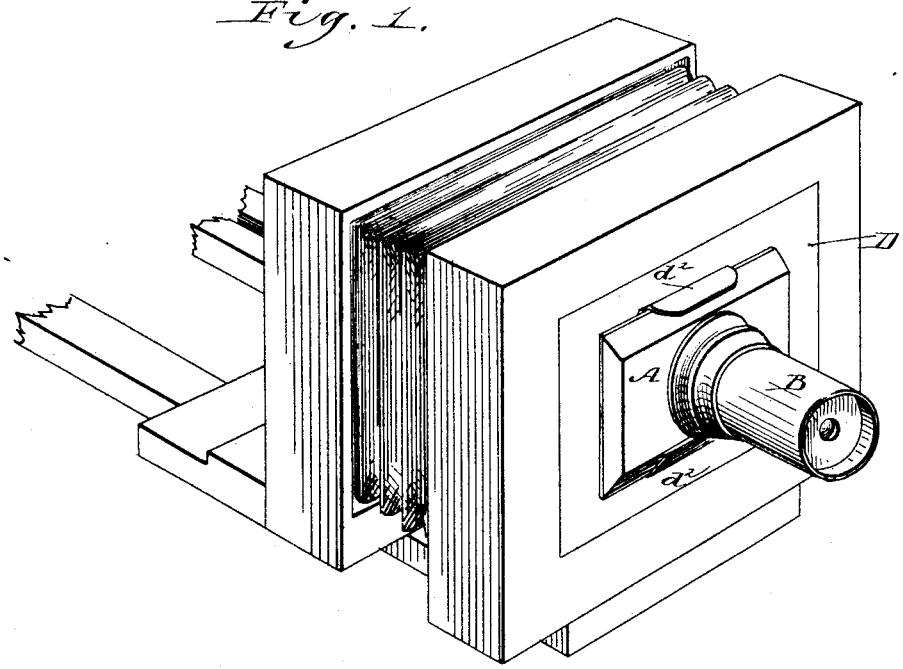
Figure 2:
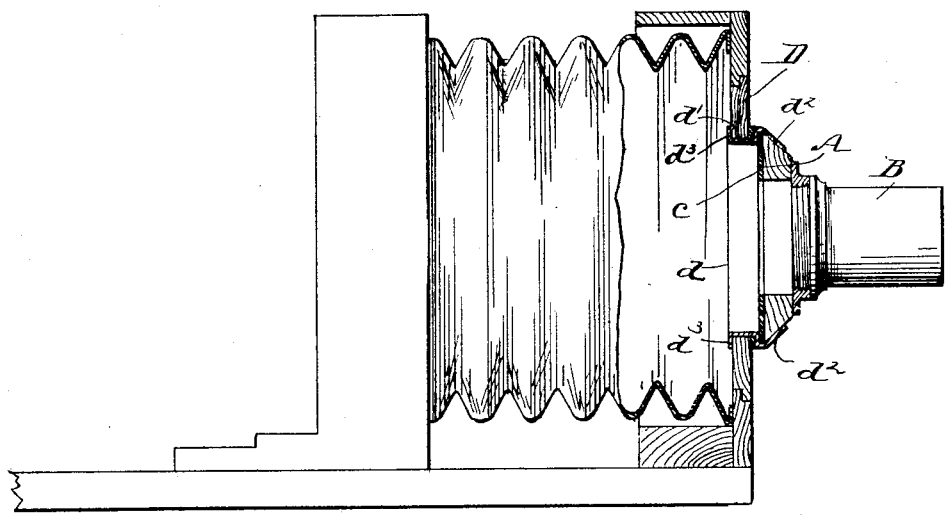
Figure 3:
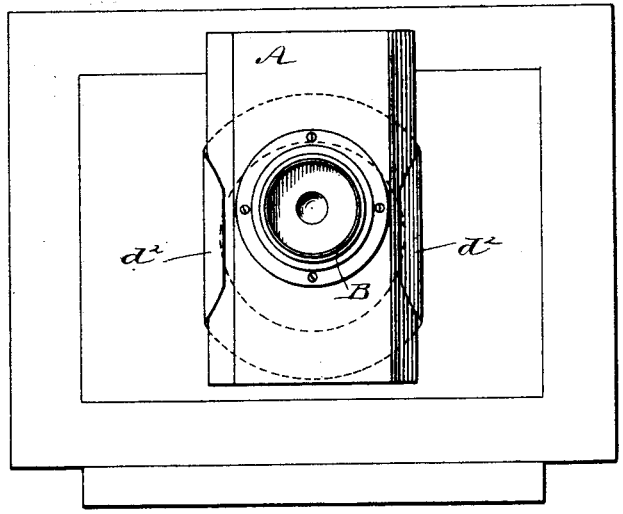
Figure 4:
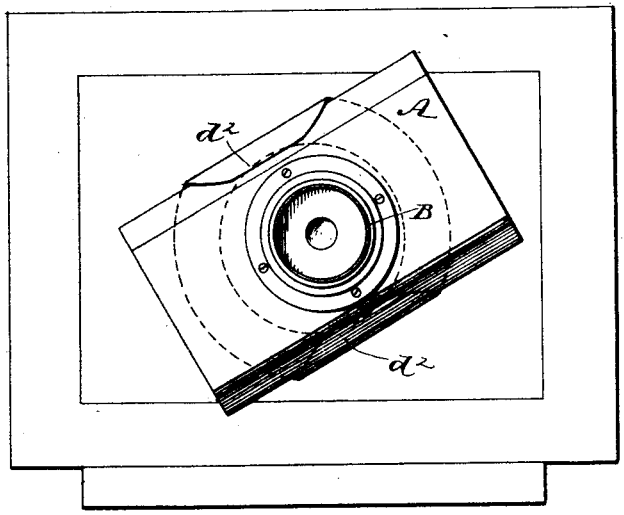

Figure 1 is a perspective view of a camera having my invention applied to the open front thereof. Fig. 2 is a sectional elevation of the same. Fig. 3 is a front view showing my invention applied to a solid-front camera, and Fig. 4 is a similar view showing the lens-tube plate turned at an angle.

The main body of the camera may be of the usual or of any approved construction.

A is the apertured plate, to which the lens-tube B is attached. This plate is made universally adjustable by a rotating connection or coupling with the camera front, in which connection it is also adapted to slide. The said connection in this instance comprises a circular metallic rim $d$, fitted in a circular opening $d'$ in the camera front, and the cleats or holders $d^2$ for the plate A. The rim $d$ is held and made tight in the opening $d'$ to exclude light by clinching its inner edge, as shown at $d^3$, Fig. 2; but any other suitable fastening means might be employed, which, while excluding the light, would permit the connection to turn quite freely in the opening $d'$. The holding-cleats $d^2$ are by preference made integral with the rim $d$, and in this instance are shaped to grasp the beveled side edges of the lens-plate A. The inner surface of the plate A is provided with a layer of felt $c$ to exclude the light.

In Figs. 1 and 2 the body of the camera is provided with an open front D, which may be removed and reversed, so that the lens and lens-tube may be carried within the bellows, and in these figures I have shown my invention applied to the said front D. In Figs. 3 and 4 I have shown my invention applied to the permanent front of the camera.

It will be understood that while I have shown the plate A having beveled side edges and the holders $d^2$ bent to conform thereto, I may employ any construction or attachment of the plate A to the rotating connection which would permit the longitudinal adjustment of the said plate.

In use, in focusing, the plate may be turned to horizontal position, as shown in Fig. 1, and adjusted to the right or left, or it may be turned to vertical position, as shown in Fig. 3, and adjusted up and down, or it may be turned at an angle—any angle, as illustrated in Fig. 4—and adjusted so that the plate is absolutely universally adjustable, adapting it to shift the lens to properly locate the image, no matter how unevenly the camera support or tripod may stand.

By making the rim $d$ of metal, and also the holders $d^2$, those parts are wholly unaffected by moisture, and are always ready for use.

Having thus described my invention, what I claim as new, and desire to secure by Letters Patent, is—

The camera front having a circular aperture, in combination with the coupling comprising a circular rim $d$, fitted to rotate in said opening and having outwardly-projecting cleats to receive the lens-plate, substantially as described.

HENRY W. HALES.

Witnesses:
  E. M. CLARK,
  C. SEDGWICK.